United States Patent [11] 3,622,659

[72] Inventors John Sonia
 Califon;
 John B. Wheeler, III, Somerville; Thomas E. Hayes, Highland Park; Robert B. Petrochko, Somerville, all of N.J.
[21] Appl. No. 799,942
[22] Filed Feb. 17, 1969
[45] Patented Nov. 23, 1971
[73] Assignee Union Carbide Corporation
 New York, N.Y.
 Continuation-in-part of application Ser. No. 721,942, Apr. 17, 1968, now abandoned. This application Feb. 17, 1969, Ser. No. 799,942

[54] THERMAL GRADIENT METHOD FOR MAKING THERMOPLASTIC MATRICES
 8 Claims, No Drawings
[52] U.S. Cl. .................................................. 264/220, 264/293, 264/327
[51] Int. Cl. .................................................. B29d 17/00, B29c 1/04
[50] Field of Search ......................................... 264/219, 220, 293, 327

[56] References Cited
UNITED STATES PATENTS

| | | | |
|---|---|---|---|
| 825,565 | 7/1906 | Voorhees | 264/293 |
| 2,400,518 | 5/1946 | Kreber | 264/220 X |
| 2,536,316 | 1/1951 | Schwarz | 264/293 X |
| 2,645,178 | 7/1953 | Brainard | 101/401.1 |
| 2,647,284 | 8/1953 | Richardson | 264/327 X |
| 3,260,779 | 7/1966 | Tarbox | 264/220 X |
| 3,380,878 | 4/1968 | Wheeler | 264/219 X |
| 3,444,275 | 5/1969 | Willett | 264/102 X |

Primary Examiner—Robert F. White
Assistant Examiner—Richard R. Kucia
Attorneys—Paul A. Rose, G. G. O'Brien and John E. Lynch ABSTRACT: An improved process for making thermoplastic matrices wherein a thermal gradient is established between the molding interface and the back of a thermoplastic matrix blank whereby the viscosity at the molding interface is high enough to resist flow into the original and the temperature at the back is sufficiently high to permit flow of molten thermoplastic.

3,622,659

THERMAL GRADIENT METHOD FOR MAKING THERMOPLASTIC MATRICES

This application is a continuation-in-part of copending U.S. application Ser. No. 721,942 filed on Apr. 17, 1968 now abandoned. This invention relates to an improved process for making thermoplastic matrices which can be used in molding printing plates, sound records and the like.

BACKGROUND

The concept of thermoplastic matrices from which to mold printing plates, sound records and the like was first disclosed in U.S. Pat. No. 3,380,878. It had been found that thermoplastics such as polyarylene polyethers, and particularly polysulfone, were useful as matrix materials because of their excellent thermal and dimensional stability at elevated temperatures. Other polyarylene polyethers, such as polyphenylene oxides were found suitable as matrix materials and are disclosed in U.S. Pat. No. 3,380,880.

Other thermoplastics useful as matrix materials include thermoplastics having a heat distortion temperature at 264 p.s.i. of at least 65° C. and are disclosed in U.S. Pat. No. 3,408,437. Included in this group are polycarbonates, polypropylene, acrylonitrile-butadiene-styrene-(ABS) terpolymers, polyhydroxy ethers, styrene-acrylonitrile copolymers, polycarbonates, poly-4-methylpentene-1 and the like.

The process for forming thermoplastic matrices described in U.S. Pat. No. 3,408,437 and copending U.S. application Ser. No. 721,942, of which the process of the present invention is an improvement, comprises the steps of contacting pellets or a thermoplastic blank described herein with an original pattern, applying heat and pressure, allowing the matrix to cool and separating the matrix and original.

These processes do not require a narrowly critical temperature range at which the matrix can be formed. Obviously, the lowest temperature is the temperature at which the polymer can be formed under pressure, and the highest is below the decomposition temperature of the polymer or the softening point of the original.

However, if the originals to be reproduced, especially typeforms, comprising cast lead Linotype slugs, Ludlow slugs, furniture spacing material, and photoengravings mounted on metal blocks, are not tightly assembled when locked in the customary foundry or molding chases, particularly in the case of newspapers, voids and spaces may occur between the various members. Molten plastic can flow into their slots and openings, sometimes to the bottoms of them, forming spikes as long as the depth of the type material, or 0.918 inches. Also the molten plastic may flow under any overhangs or undercuts in the original form. Thus the matrix may not be easily separated from the original form and much extra labor and time can be entailed to get them apart.

The improvement of the present invention seeks to prevent and eliminate such hangups by inducing a thermal gradient between the molding interface and the backside of a thermoplastic sheet forming a matrix blank. The melt viscosity of a thermoplastic polymer decreases with increasing temperature, above its softening temperature. Just above the softening temperature the polymer is highly viscous and will flow under pressure only at an extremely slow rate, while at temperature well above the softening temperature the viscosity becomes quite low and the melt flows readily. Thus, we have found that under pressure the surface of a thermoplastic matrix blank in contact with a form and maintained at a temperature just above its softening point can be embossed to reproduce exactly the details of the original form. At the same time the plastic will not be forced into the deeper voids between the members comprising the form, because it is too stiff to flow into them during the time allowed for molding the matrix. However, if at the same time the back of the matrix blank is heated to a much higher temperature with a corresponding large decrease in its viscosity, this low viscosity layer can be made to flow sideways with the result that the floor thickness and relief are adjusted as desired and the back of the matrix is leveled so that the nonimage zones are supported during the subsequent plate molding operations.

SUMMARY

Broadly, the improved process for forming thermoplastic matrices comprises contacting one side of a thermoplastic matrix blank with an original form; contacting the back of the blank with a mold release sheet whereby the temperature at the molding interface of the thermoplastic sheet approximates the softening temperature of the thermoplastic, and the viscosity at the interface is high enough to resist flow into voids in the original and the temperature at the back is sufficiently high to permit flow of the molten thermoplastic; applying sufficient pressure whereby the thermoplastic sheet at the molding interface is embossed so as to replicate the surface detail of the original to form a matrix, without flow of thermoplastic into the original and; allowing the matrix to cool and separating the matrix from the original.

DESCRIPTION

Thermoplastic materials that can be formed into matrices for use in this invention include polyarylene polyethers, polypropylene, acrylonitrile-butadiene-styrene (ABS) copolymers, polyhydroxyether, impact polystyrene, styrene-acrylonitrile copolymers, polycarbonates, poly-4-methylpentene-1, phenoxys, polyoxymethylenes, polymethacrylates, and the like.

The preferred class of thermoplastic polymers comprises those with a high degree of rigidity and little or no crystallinity in which the softening temperature and the glass transition temperature coincide. These polymers are known as amorphous and include polyarylene ethers, polycarbonates, polystyrenes, polymethacrylates, polyhydroxy ethers, and the like.

For clarity of the present invention the glass transition temperature of a polymer is defined herein as the center of a narrow temperature range where the polymer changes from a viscous or rubbery conditions at temperatures above this region to a hard and brittle one below it, where there is insufficient thermal energy to cause rotation of the segments of the polymer chain. This transition is equivalent to the solidification of a liquid to a glass. It is designated as the second order or glass transition temperature. In it are manifested changes in specific volume, heat content, thermal conductivity, coefficient of thermal expansion and especially stiffness as measured by modulus of elasticity, which above the glass transition temperature becomes very small, in the range of 100 p.s.i. The glass transition temperature is, therefore, taken as the softening temperature of an amorphous polymer. A typical method of determining the glass transition temperature is to make measurements of specific volume as a function of increasing temperature. At the transition region the slope of this curve changes abruptly to a larger value. Examples of glass transition temperatures of typical hard, amorphous polymers, suitable for use in this invention are:

| MATERIAL | $T_g$° F. |
|---|---|
| Polysulfone | 375 |
| Polyphenylene oxide | 400 |
| Bisphenol A polycarbonate | 302 |
| Acrylonitrile, butadiene styrene, terpolymer | 230 |
| Polystyrene | 210 |
| Polymethylmethacrylate | 200 |

Crystalline polymers on the other hand, soften at their crystalline melting points, which are usually substantially higher than their glass transition temperatures.

Examples of crystalline polymers useful in this invention are poly-4-methylpentene-1, polyoxymethylenes, and polypropylenes. The crystalline melting points of these polymers are usually determined by observing the temperature at which cloudiness in the polymer sample disappears as temperature increases, indicating complete dissolution of the ordered crystalline region of the solid polymer.

Poly-4-methylpentene-1 melts at 465° F. and polypropylene melts at 335° F.

As employed herein the term softening temperature shall include either the glass transition temperature of amorphous polymers and/or the melting point of crystalline polymers and is intended to mean the point at which a polymer can be embossed and exhibits high viscosity.

Preferred matrices are formed from linear thermoplastic polyarylene polyethers having a basic structure composed of recurring units having the formula:

wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through the aromatic carbon atoms. The foregoing polyarylene polyethers and their preparation are described in detail in U.S. Pat. No. 3,380,878.

Matrices can be formed from other thermoplastic polyarylene polyethers composed of recurring units having the formula:

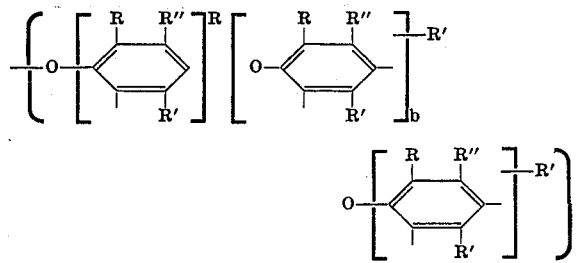

wherein the free valence of the terminal oxygen atom of 1 unit is connected to the free valence of the terminal benzene nucleus of the adjoining unit, $b$ is an integer of from 0 to 1, inclusive, R is a monovalent substituent selected from the group of hydrocarbon radicals, halohydrocarbon radicals having at least two carbon atoms, R' and R'' are the same as R and in addition hydrogen, said matrix exhibiting uniform mold shrinkage in all directions of 0.7 percent and less, and characterized by being thermally and dimensionally stable at molding temperatures of up to 350° F. The foregoing polyarylene polyethers and their preparations are described in U.S. Pat. No. 3,314,753.

Polyhydroxyethers are substantially linear polymers having the formula:

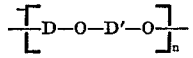

wherein D is the radical residuum of a dihydric phenol, D' is a hydroxyl containing radical residuum of an epoxide and $n$ represents the degree of polymerization and is at least 30 and is preferably 80 or more.

Thermoplastic polyhydroxyethers and their preparation are described in U.S. Pat. No. 3,245,865.

Suitable polycarbonates have recurring structural units of the formula:

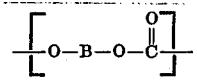

wherein B is a divalent aromatic radical of a dihydric phenol.

By way of explanation, it must be understood that the scope of the present invention is not limited to the matrix materials disclosed herein and that most thermoplastic materials can be used as matrices with the proviso that printing plates, sound records, and the like can be molded against such material.

Generally, the temperature at the molding interface of the thermoplastic approximates its softening temperature in order for the material to emboss the original under pressure, while the viscosity at the interface remains sufficiently high to resist flow into the nonimage areas of the original. In the instance where polysulfone is used as the matrix material, the temperature at the molding interface approximates 375°-400° F.

The temperature at the backside of the matrix blank will be below the decomposition temperature and above the melt flow temperature of the polymer. For example, in the instance where the polymer is a polyarylene polyether and the molding interface temperature is about 375°-400° F. the backside temperature will be in the range from about 415° F. to about 750° F.

Preferably, heat is also transmitted to the molding interface of the matrix sheet from the original which is preheated to temperatures of from about 25° F. to about 100° F. below the softening temperature of the matrix material.

Heat can be supplied by any conventional heating means, such as a heating plate. The heat is directed from the backside of the thermoplastic sheet. Preferably, the temperature of a hot plate approximates the temperature at which the polymer flows readily and is about 700° F. in the instance where the thermoplastic material is polysulfone.

Molding pressure can vary widely. Useful molding pressures range from 200 p.s.i. to 2000 p.s.i. preferably from 250 p.s.i. to 500 p.s.i. Pressure is generally applied for about 10 to 120 seconds.

Thermoplastic matrices may be reprocessed either by regrinding and reextruding into sheet or by adding thinner makeup sheets of the same material as disclosed in copending U.S. Pat. application No. 721,942.

Matrix blanks can be formed from thermoplastic pellets or sheets. However, it is preferred that they be formed from sheets.

Sheets suitable as blanks in the process of the present invention can be fabricated by any known thermoplastic forming technique such as extruding, compression molding, injection molding solution casting, and the like. The thickness of the sheets employed is not critical but is rather governed by practical considerations such as cost and ease of forming. In general, the most useful range of thickness for thermoplastic sheets is from about 0.030 inch to about 0.250 inch while the range of from about 0.070 inch to about 0.125 inch is preferred.

Generally, matrices can be formed from such originals as unmounted copper engravings, unmounted zinc and magnesium engravings, and type metal such as Linotype and the like.

In general, the matrix separates readily from an original pattern or duplicate plate or the like without the aid of a mold release agent. However, if desired, mold release agent can be used to effect separation between the matrix and original or duplicate member. Suitable mold release agents are graphites, molybdenum disulfide and silicone oils, and the like. The use of solvents or agents which attack the matrix material should be avoided.

Preferably, a mold release sheet is placed directly between the heating plate and the matrix to eliminate air entrapment and prevent softened polymer from adhering to the hot plate. Suitable mold release sheets include glass cloth impregnated with silicone resin, Teflon sheet, and the like. Thickness of the sheet is not critical and depends solely upon its composition. For example, when a glass cloth impregnated with silicone resin is employed, thickness within the range of from about 0.002 inches to about 0.01 inches is suitable.

Polymeric material that can be molded against the matrix of the present invention to produce printing plates and the like are normally solid thermoplastic materials preferably having softening temperatures (e.g., melt forming temperatures) not greater than about 172° C. above the HDT of the matrix. Suitable thermoplastic materials include polyolefins such as polyethylene and polypropylene, polyvinyl chloride, polyvinyls ABS, polystyrene, styreneacrylonitrile copolymers, polyacrylates, polymethacrylates, polyamides, polycarbonates, polyhydroxyethers, polyarylene polyethers, polymethylenes, copolymers and mixtures of the foregoing and are described in U.S. Pat. No. 3,408,437.

Thermoplastic material moldable against the matrix of the present invention can contain any well known additive such as fillers, dyes, pigments, cross-linking agents, curing agents, stabilizers, plasticizers, preservatives, lubricants, antioxidants, and the like. However, polymeric molding formulations should not contain solvents or other materials which attack the thermoplastic matrix. In general, any component which is inert with respect to the matrix and the polymer molded against the matrix can be included in a molding formulation.

The hot, formable thermoplastic material can be forced against the matrix to form duplicate members in three ways: injecting the hot thermoplastic material into a mold cavity formed by the matrix and a confining member which defines the shape of the desired duplicate article with the matrix under sufficient pressure to fill the mold cavity and duplicate the matrix surface; injecting a mass of hot thermoplastic material and placing it on the matrix and rapidly compression molding this mass to conform to the matrix in the shape of the desired duplicate article; and extruding a mass of hot thermoplastic material and placing it on the matrix and rapidly compression molding this mass to conform to the matrix in the shape of the desired duplicate article.

In the preferred embodiment the thermoplastic matrix blank is a sheet of polyarylene polyether, sold under the name of Polysulfone by Union Carbide Corporation, having a melt flow of 7 to 10 dg./min. at 44 p.s.i. and 350° C., and 246 p.s.i. heat distortion temperature of 345° F. and a glass transition temperature of 375° F. The preferred sheet thickness is 0.080 inches and the image floor when molded is 0.050 inches, allowing a minimum relief of 0.030 inches.

The sheet of polysulfone is placed on an original form, a sheet of 5 mesh glass cloth, having a Teflon coating on one side, with total thickness about 0.005 inches, is placed over the plastic sheet with the Teflon side against the matrix blank. This combination is placed in a molding press, having a lower platen which is a heat sink heated to about 325° F., which is allowed to heat the original form to approximately that temperature. The temperature distribution over the surface of the original form must be maintained within 20° F. or less. A hot plate at approximately 700° F. is placed inside the press with a suitable layer of insulation between it and the top platen of the press, and the press is closed with a light pressure about 2 to 5 p.s.i. for about 10 to 20 seconds. This softens the sheet and introduces a temperature rise at the interface of the original from 325° to 375°–400° F. A temperature gradient is thus established in the plastic sheet, since the layer next to the heater approaches 700° F. and an equilibrium heat flow condition from heat source to heat sink results.

Pressure is increased to about 250 p.s.i. to cause embossing at the interface of the plastic and the original form and to cause flow to take place sideways in the softened backside of the sheet next to the heater, and the matrix is molded to the desired floor thickness of about 0.050 inches. The embossing and floor portion of the cycle take from 10 to 120 seconds depending on the configuration of the original form. The press is then opened, the hot plate removed and the press reclosed with approximately 500 p.s.i. for from 10 to 20 seconds to cool and solidify the matrix. The press is then opened, the matrix and form removed and the matrix separated from the form. By this procedure this hot, low viscosity material is enabled to move sideways but does not penetrate the cooler, high viscosity layer at the molding interface, which is being embossed with the image contours in the original, and which itself remains too viscous to flow into any nonimage openings or voids.

The mechanical means for achieving the above described molding may be made completely automatic for very rapid cycling of the process. Likewise not only the hot plate may move in or out of the press, which may be either of the hydraulic ram type or of the hydraulically actuated toggle type.

The following examples are illustrative of the present invention and are not intended to limit the same.

EXAMPLE 1

A newspaper sized type form, measuring 21 inches×14⅝ inches was locked in a standard newspaper chase. A 16⅝ inches ×24¼ inches ×0.080 inches thick extruded sheet of polysulfone, having a melt flow of 7.5 dg./min. at 350° C. and 44 p.s.i., a 264 p.s.i. heat distortion temperature of 345° F. and a glass transition temperature of 375° F., was dried in an oven for three hours at 250° F. to remove all traces of absorbed moisture. The typeform was placed on the lower platen of a molding press which was heated to 350° F., for a period of 15 minutes to raise the printing surface of the type to 325°±10° F. The matrix blank was then placed on the typeform and covered with a release sheet, comprising a number 128 mesh glass cloth having a Teflon coating on the side against the matrix blank. The total thickness of the release sheet was 0.005 inches. The press was equipped with a 700° F. heated steel plate, having a sheet of high temperature insulation on its upper surface large enough to cover the matrix blank, which was moved into the press. The press was then closed on the sandwich for 15 seconds at 3 p.s.i. This established the thermal gradient through the sheet and raised the surface temperature of the typeform to 375° F. The pressure was then increased to 250 p.s.i. for approximately 45 seconds so that the detail from the original was embossed into relatively cool, highly viscous molding interface of the matrix while the hot, low viscosity layer next to the release sheet flowed out until the floor thickness over the raised printing surfaces of the type letters had been reduced to 0.050 inches. The press was then opened, the heated steel plate retracted, and the press reclosed to cool the matrix against the cold upper platen of the press for 15 seconds under a pressure of 500 p.s.i.

Upon removal from the press the matrix was easily separated from the typeform and showed no prongs or hangups around the openings and voids between the various type members in the form. The matrix showed excellent reproduction of the type detail and uniform floor thickness throughout the image areas. This matrix was then trimmed to 16 inches×24 inches, shaved on the image side to remove irregular projections in the nonimage areas and inserted in a plate mold from which a dozen polypropylene printing plates were compression molded. All showed excellent reproduction of the original.

EXAMPLE 2

To demonstrate the thermal gradient effect in making a printing plate matrix, two pieces of polysulfone were laminated together to make a sheet 12 inches×12 inches×0.080 inches. The laminate comprised on the molding interface side a layer of polysulfone having a melt flow of 17 dg./min. at 44 p.s.i. and 350° C. and containing 5 percent by weight of a silicone/polysulfone block copolymer dispersed in it as an impact modifier which produced a white, milky color in the plastic. The layer at the back of the sheet consisted of polysulfone, having a melt flow of 7.5 dg./min. at 44 p.s.i. and 350° C. and containing 0.03 percent of alizarin cycanine dye dispersed therein, which produced a dark green on the other. A 3¼ inches×3¼ inches square grease pencil line was drawn in the center of each side of the sheet. Both materials in the laminate had a glass transition temperature of 375° F.

A 7½ inches×7½ inches×0.918 inches block of aluminum was locked in a chase whose inside dimensions were 10 inches×10 inches and outside dimensions were 12 inches×12 inches. This original form was placed on the 350° F. lower platen of the molding press and heated to a surface temperature of 325° F. The hot plate was heated to 660° F. Molding was carried out as in example 1 except that the pressing time was shortened to 20 seconds to obtain a floor thickness of 0.050 inches.

The matrix separated easily from the form. There was no flow into the openings in the nonimage zones and no hangups. The square which was drawn on the molding interface side of the matrix had the same 3¼ inches ×3¼ inches dimensions as before molding, but the square drawn on the back had flowed sideways toward the exterior edges of the matrix until it had dimensions of approximately 5¼ inches ×6¼ inches. This distortion clearly showed how the back flowed outward while the image side exhibited no sideways flow and only embossing to receive the image details. The results of this example are especially significant because the freer flowing material was placed on the image side and the more viscous material at the back. Nevertheless, the back flowed markedly and the image did not.

What is claimed is:

1. An improved process for forming a thermoplastic matrix comprising:
   A. Contacting the faceside of a thermoplastic matrix blank with an original form;
   B. Contacting the backside of said blank with a mold release sheet;
   C. Applying sufficient heat against said mold release sheet whereby the temperature at the molding interface of said matrix sheet approximates the softening temperature, and the viscosity at the molding interface is high enough to resist flow, and the temperature of the matrix backside is sufficiently high to permit a flow of molten thermoplastic;
   D. Applying sufficient pressure whereby the thermoplastic sheet at the molding interface is embossed so as to replicate the surface details of the original to form a matrix without flow of thermoplastic into the original and;
   E. Cooling said matrix and separating the matrix from the original.

2. The process of claim 1 wherein the original is preheated to a temperature of about 25° F. to about 100° F. below the softening temperature of the thermoplastic matrix blank.

3. The process of claim 1 wherein the said thermoplastic is composed of recurring units having the formula:

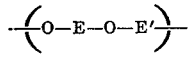

wherein E is the residuum of a dihydric phenol and E' is the residuum of a benzenoid compound having an inert electron withdrawing group in at least one of the positions, ortho or para to the valence bonds, and where both of said residua are valently bonded to ether oxygen through aromatic carbon atoms.

4. The thermoplastic material defined in claim 3 wherein said polyarylene polyether is composed of recurring units having the formula:

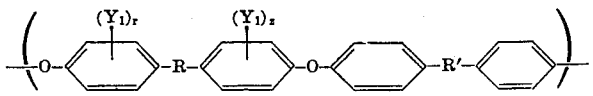

wherein R represents a member of the group consisting of a bond between aromatic carbon atoms and a divalent connecting radical and R' represents a member of the group consisting of sulfone, carbonyl, vinyl, sulfoxide, azo, saturated fluorocarbons, organic phosphine oxide and ethylidene groups and Y and $Y_1$ each represent inert substituent groups selected from the group consisting of halogen, alkyl groups having from one to four carbon atoms and alkoxy groups having from one to four carbon atoms and where $r$ and $z$ are integers having a value from 0 to 4 inclusive.

5. The thermoplastic sheet defined in claim 3 wherein said polyarylene polyether is composed of recurring units having the formula:

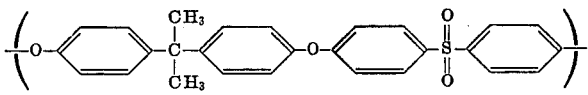

6. The thermoplastic sheet defined in claim 3 wherein said polyarylene polyether is composed of recurring units having the formula:

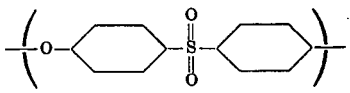

7. The process of claim 1 wherein the said thermoplastic sheet is a polycarbonate composed of recurring units of the formula:

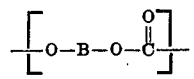

wherein B is a divalent aromatic radical of a dihydric phenol.

8. The process of claim 5 wherein the temperature at the molding interface is from about 375° F. to about 400° F. and the temperature at the backside of the said blank is about 700° F.

* * * * *

UNITED STATES PATENT OFFICE
CERTIFICATE OF CORRECTION

Patent No. 3,622,659   Dated November 23, 1971

Inventor(s) John Sonia, John B. Wheeler, III, Thomas E. Hayes & Robert B. Petrochko It is certified that error appears in the above-identified patent and that said Letters Patent are hereby corrected as shown below:

Column 2, line 10, insert after the words "mold release sheet" --applying sufficient heat against the mold release sheet--.

Column 3, line 52, "3,314,753", should read as follows: --3,134,753--.

Column 7, line 10, "5 1/4 inches x 6 1/4 inches", should read, --5 1/2 inches x 6 1/2 inches--.

Signed and sealed this 30th day of May 1972.

(SEAL)
Attest:

EDWARD M. FLETCHER, JR.
Attesting Officer

ROBERT GOTTSCHALK
Commissioner of Patents